United States Patent
Sugata et al.

(10) Patent No.: US 11,985,450 B2
(45) Date of Patent: May 14, 2024

(54) VEHICLE ELECTRONIC DEVICE, CONTROL METHOD AND PROGRAM

(71) Applicant: JVCKENWOOD Corporation, Yokohama (JP)

(72) Inventors: Akinori Sugata, Yokohama (JP); Yukihiko Murakami, Yokohama (JP); Tomoki Kojima, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 37 days.

(21) Appl. No.: 17/713,271

(22) Filed: Apr. 5, 2022

(65) Prior Publication Data

US 2022/0232194 A1  Jul. 21, 2022

Related U.S. Application Data (63) Continuation of application No. PCT/JP2020/028408, filed on Jul. 22, 2020.

(30) Foreign Application Priority Data

Oct. 9, 2019  (JP) ................................ 2019-185735

(51) Int. Cl.
*H04N 7/18* (2006.01)
*G01C 21/00* (2006.01)
(Continued)

(52) U.S. Cl.
CPC ......... *H04N 7/188* (2013.01); *G01C 21/3811* (2020.08); *G01C 21/3867* (2020.08);
(Continued)

(58) Field of Classification Search
None
See application file for complete search history.

(56) References Cited

U.S. PATENT DOCUMENTS

| 6,308,177 | B1 | 10/2001 | Israni et al. |
| 2004/0148098 | A1* | 7/2004 | Yato ....................... G01C 21/34 340/995.19 |

(Continued)

FOREIGN PATENT DOCUMENTS

| JP | 08-014924 | 1/1996 |
| JP | 09-325692 | 12/1997 |

OTHER PUBLICATIONS

International Search Report and Written Opinion for International Application No. PCT/JP2020/028408 dated Sep. 29, 2020, 8 pages.

(Continued)

*Primary Examiner* — Christopher J Fibbi
(74) *Attorney, Agent, or Firm* — Amin, Turocy & Watson, LLP (57) ABSTRACT

A vehicle electronic device includes a position information acquisition unit configured to acquire position information of a current position of a vehicle; a map information storage unit configured to store map information presenting a map for identifying an area corresponding to the current position of the vehicle on the map; and an area identification unit configured to identify the area corresponding to the current position of the vehicle based on the position information acquired by the position information acquisition unit and the map information stored in the map information storage unit. The map information is information for identifying a border of an area containing a country, a prefecture, a municipality, a state or a district. The border of the area is specified as a set of points representing the border.

6 Claims, 5 Drawing Sheets

(51) Int. Cl.
*G07C 5/08* (2006.01)
*H04N 23/80* (2023.01)
*G09B 29/00* (2006.01)
(52) U.S. Cl.
CPC ............... *G07C 5/08* (2013.01); *H04N 23/80*
(2023.01); *G09B 29/007* (2013.01)

(56) References Cited

U.S. PATENT DOCUMENTS

| | | | | |
|---|---|---|---|---|
| 2005/0165539 A1* | 7/2005 | Hahlweg | ................ | G01C 21/26 |
| | | | | 701/532 |
| 2005/0209774 A1* | 9/2005 | Finlay | .............. | G08G 1/096775 |
| | | | | 701/532 |
| 2010/0225651 A1* | 9/2010 | Nomura | ............. | G01C 21/3867 |
| | | | | 345/441 |
| 2010/0299370 A1* | 11/2010 | Otto | ..................... | G09B 29/003 |
| | | | | 707/E17.005 |
| 2011/0066657 A1* | 3/2011 | Weiland | .................. | G06F 16/29 |
| | | | | 707/803 |
| 2015/0095355 A1* | 4/2015 | Patton | .................... | H04W 4/021 |
| | | | | 707/754 |
| 2015/0161438 A1* | 6/2015 | Geringer | ............. | G06F 16/5854 |
| | | | | 382/113 |
| 2020/0385014 A1* | 12/2020 | Hanniel | ............. | G01C 21/3815 |

OTHER PUBLICATIONS

European Office Action for European Patent Application No. 20874361.7 dated Jun. 1, 2023.

\* cited by examiner

| No. | LATITUDE | LONGITUDE | ASSOCIATED INFORMATION |
|---|---|---|---|
| 1 | ○○.○○ | ○○.○○ | ○ |
| i | ○○.○○ | ○○.○○ | ○ |
| N | ○○.○○ | ○○.○○ | ○ |

VEHICLE ELECTRONIC DEVICE, CONTROL METHOD AND PROGRAM

CROSS-REFERENCE TO RELATED APPLICATION

This application is a Continuation of PCT International Application No. PCT/JP2020/028408 filed on Jul. 22, 2020 which claims the benefit of priority from Japanese Patent Application No. 2019-185735 filed on Oct. 9, 2019, the entire contents of which are incorporated herein by reference.

BACKGROUND

The present disclosure relates to a vehicle electronic device, a control method, and a computer-readable storage medium.

As for map information that is used for navigation, a technique of making straight lines forming roads finer than straight lines forming coastlines when coastlines and roads are represented by a combination of straight lines is known (for example, refer to Japanese Laid-open Patent Publication No. H9-325692).

Detailed map information that a navigation system uses contains information on roads, information on geographies, and information on buildings or facilities. Such detailed map information has a large volume of information and needs a storage device with a large memory capacity. When processing, etc., are performed using detailed map information, the load of processing could possibly increase.

SUMMARY

A vehicle electronic device according to an embodiment includes: a position information acquisition unit configured to acquire position information of a current position of a vehicle; a map information storage unit configured to store map information presenting a map for identifying an area corresponding to the current position of the vehicle on the map; and an area identification unit configured to identify the area corresponding to the current position of the vehicle based on the position information acquired by the position information acquisition unit and the map information stored in the map information storage unit. The map information is information for identifying a border of an area containing a country, a prefecture, a municipality, a state or a district. The border of the area is specified as a set of points representing the border.

A control method according to an embodiment includes: acquiring position information of a current position of a vehicle; and identifying an area corresponding to the current position of the vehicle based on the acquired position information and map information that is stored in a map information storage unit, the map information presenting a map for identifying an area corresponding to the current position of the vehicle on the map, the map information being for identifying a border of an area containing a country, a prefecture, a municipality, a state or a district. The border of the area is specified as a set of points representing the border.

A non-transitory computer-readable storage medium according to an embodiment stores a computer program causing a computer to execute: acquiring position information of a current position of a vehicle; and identifying an area corresponding to the current position of the vehicle based on the acquired position information and map information that is stored in a map information storage unit, the map information presenting a map for identifying an area corresponding to the current position of the vehicle on the map, the map information being for identifying a border of an area containing a country, a prefecture, a municipality, a state or a district. The border of the area is specified as a set of points representing the border

DETAILED DESCRIPTION

Embodiments of a vehicle recording device, a control method and a program according to the disclosure will be described in detail below with reference to the accompanying drawings. The embodiments below do not limit the present invention. In the embodiments, the vehicle electronic device is described as a vehicle recording device 10.

First Embodiment

Figure 1:
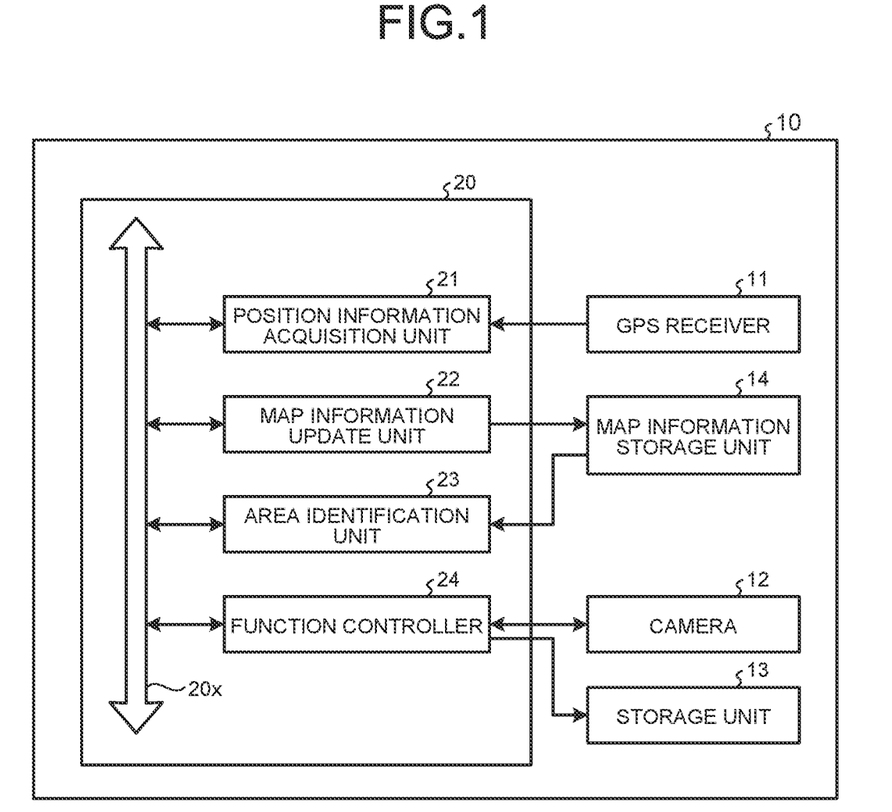
FIG. 1 is a block diagram illustrating an example of a configuration of a vehicle recording device according to a first embodiment.

FIG. 1 is a block diagram illustrating an example of a configuration of the vehicle recording device 10 according to a first embodiment. The vehicle recording device 10 is, for example, what is called a driving recorder. The vehicle recording device 10 includes a GPS (Global Positioning System) receiver 11 that is an example of a GNSS (Global Navigation Satellite System), a camera (imaging unit) 12, a storage unit 13, a map information storage unit 14 and the controller 20.

The GPS receiver 11 consists of a GPS receiver circuit, a GPS receiving antenna, etc., and receives GPS signals. The GPS receiver 11 outputs the received GPS signals to a position information acquisition unit 21.

The camera 12 is a camera that shoots the surroundings of the vehicle. The camera 12 performs omnidirectional shooting around the vehicle. The camera 12 is, for example, arranged at the front of the vehicle and shoots the surroundings around the front of the vehicle. In the camera 12, processing relating to shooting and saving is controlled by a function controller 24. More specifically, in the camera 12, the start of shooting and the end of shooting are controlled according to a control signal from the function controller 24. Video data captured by the camera 12 is saved in the storage unit 13 according to a control signal from the function controller 24. The video data is a moving image consisting of images of 30 frames per second.

The storage unit 13 records various types of data in the vehicle recording device 10. The storage unit 13, for example, records video data that is captured by the camera 12 while the vehicle is traveling and the vehicle is parked. The storage unit 13 can be enabled by a semiconductor memory device, such as a RAM (Random Access Memory) like a SD card or a flash memory, or a storage device, such as a hard disk or a solid state drive. The storage unit 13 may consist of a plurality of different memories. Alternatively, it may be an external storage device that is connected by radio via a communication device not illustrated in the drawing. The storage unit 13 records video data according to a control signal that is output from the function controller 24.

The map information storage unit 14 stores map information presenting a map that for identifying an area corresponding to the current position of the vehicle on the map. The map information is information for identifying the area corresponding to the current position of the vehicle. More specifically, the map information is, for example, information of an outline for identifying the border of a region (area) including a country, a prefecture, a municipality, a state or a district. The area may be a region on which a function restriction including starting and stopping shooting and recording by the vehicle recording device 10, a frame rate at shooting, a time zone of a clock that the vehicle recording device 10 manages, a system of units of the distance, rate, or the like, that the vehicle recording device 10 uses, a file name or a folder name of video data to be saved, or function control including necessity of keeping shooting is specified. The map information only has to make it possible to identify the outline of the area representing the border of the area. In other words, the map information only have to make it possible to identify the closed area presenting the border of the area. The map information, for example, does not contain information on roads, information on geographies, and information on buildings or facilities like detailed map information that a so-called navigation system uses. The map information storage unit 14 may be an external storage device that is connected via a communication unit not illustrated in the drawing.

Figure 2:
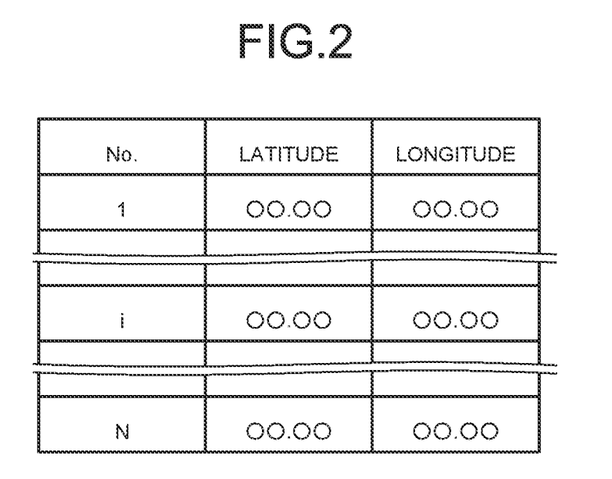
FIG. 2 is a diagram illustrating an example of map information according to the first embodiment.
Figure 3:
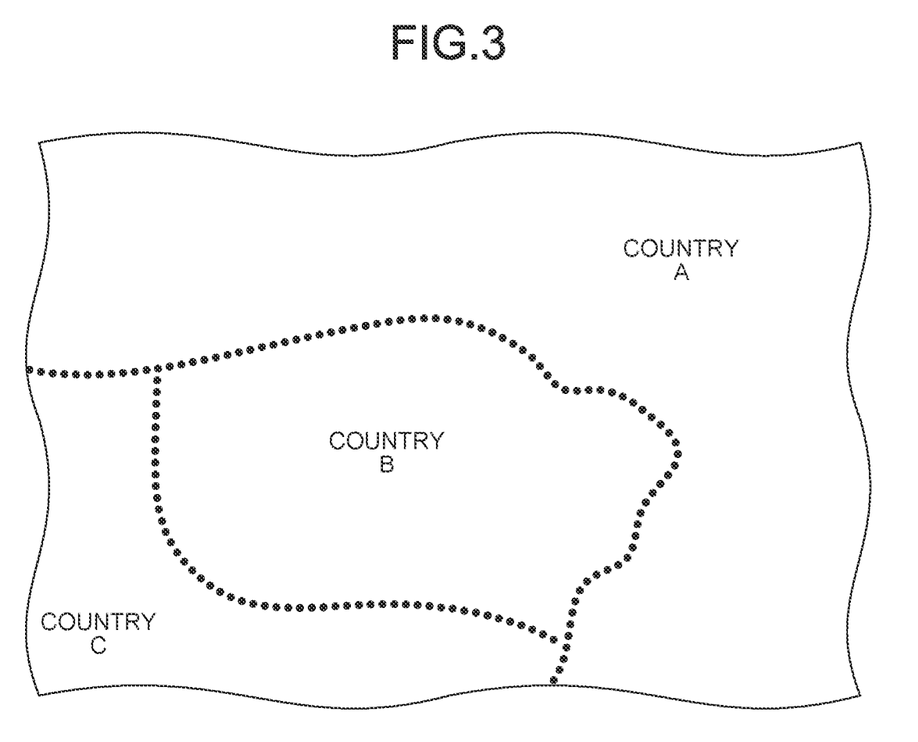
FIG. 3 is a schematic diagram illustrating an example of the map information according to the first embodiment.

FIG. 2 is a diagram illustrating an example of the map information according to the first embodiment. FIG. 3 is a schematic diagram illustrating an example of the map information according to the first embodiment. The border of the area is specified as a set of a plurality of points representing the border. In the present embodiment, the border of the area is specified as the set of points presented by latitudes and longitudes. For example, FIG. 2 is map information on Country B. As illustrated in FIG. 2, the map information stores the set of points representing the border of the closed area as a table. The points representing the border includes points that are positioned on a border line and points that are positioned on an approximate border line that approximates the border line. The map information presented in FIG. 2 specifies the closed area that is the outline of Country B as a set of points from the first point of a number "1" to the last point of a number "N". Each of the points has information of the latitude and longitude representing the position of the point. In the present embodiment, the map information is information of the latitudes and longitudes positioned on the border line of the closed area. Connecting the points by straight lines from the first to n-th in order and back from the n-th to the first presents the border of the area that is the closed area, that is, the outline of Country B.

FIG. 3 illustrates the borders among Country A, Country B and Country C. In FIG. 3, the closed area of Country B is displayed. In FIG. 3, part of Country A and part of Country C are presented and the closed area of Country A and the closed area of Country B are not presented. In FIG. 3, the distances each between adjacent points are equal.

In the map information storage unit 14, a data update is enabled by a map information update unit 22. In the map information storage unit 14, the data is updated every time the border of the area is changed or at any timing.

The controller 20 controls each unit of the vehicle recording device 10. The controller 20 is, for example, an arithmetic processing unit consisting of a CPU (Central Processing Unit), etc. The controller 20 loads a program that is stored in a storage unit not illustrated in the drawing into a memory and executes instructions contained in the program. The controller 20 includes the position information acquisition unit 21, the map information update unit 22, an area identification unit 23, and the function controller 24. An internal memory not illustrated in the drawing is included in the controller 20 and the internal memory is used to temporarily store data in the controller 20.

The position information acquisition unit 21 acquires position information presenting the current position of the vehicle. Based on radio waves that are received by the GPS receiver 11, the position information acquisition unit 21 calculates position information on the current position of the vehicle by a known method. The position information acquisition unit 21 may calculate position information on the current position of the vehicle, using another positioning system including a quasi-Zenith Satellites. The position information is identified by information necessary to estimate a position, such as the latitude, longitude and altitude.

The map information update unit 22 updates the map information that is stored in the map information storage unit 14. The map information update unit 22 updates the data every time the border of the area is changed or at any timing.

The area identification unit 23 specifies an area corresponding to the current position of the vehicle. More specifically, the area identification unit 23 specifies the area corresponding to the current position of the vehicle based on the position information that is acquired by the position information acquisition unit 21 and the map information that is stored in the map information storage unit 14. The area identification unit 23 specifies an area corresponding to the latitude and longitude that the position information on the current position of the vehicle presents from the map information that the map information storage unit 14 stores. For example, the area identification unit 23 specifies areas, such as Country A or Country B, according to the position information.

The function controller 24 controls the function of the vehicle recording device 10. In the present embodiment, the function controller 24 controls starting and stopping shooting and recording performed by the vehicle recording device 10.

The function controller 24 may control the function of the vehicle recording device 10 according to the area that is identified by the area identification unit 23. For example, the function controller 24 may control starting and stopping shooting and recording, the frame rate at shooting, the time zone of the clock that the vehicle recording device 10 manages, the system of units of the distance or rate that the vehicle recording device 10 uses, the file name or folder name of the video data that is saved, or necessity of keeping shooting.

Figure 4:
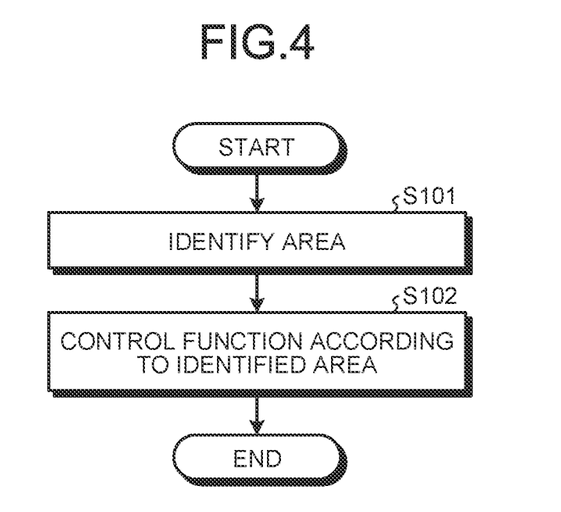
FIG. 4 is a flowchart illustrating an example of a flow of a process in a vehicle recording device according to the first embodiment.

Using FIG. 4, a flow of a process in the controller 20 will be described next. FIG. 4 is a flowchart illustrating an example of the flow of the process in the vehicle recording device 10 according to the first embodiment. While the vehicle recording device 10 is being on, the position information acquisition unit 21 keeps acquiring the position information presenting the current position of the vehicle. The vehicle recording device 10 executes the process of the flowchart illustrated in FIG. 4 at given intervals of time or at given intervals of distances of travel.

By the area identification unit 23, the controller 20 specifies an area corresponding to the current position of the vehicle (step S101). More specifically, based on the map information that the map information storage unit 14 stores and the position information that is acquired by the position information acquisition unit 21, the area identification unit 23 specifies an area corresponding to the current position of the vehicle. The controller 20 goes to step S102.

By the function controller 24, the controller 20 controls the function of the vehicle recording device 10 according to the area that is identified by the area identification unit 23 (step S102). For example, according to the area that is identified by the area identification unit 23, the function controller 24 controls starting and stopping shooting and recording, the frame rate at shooting, the time zone of the clock that the vehicle recording device 10 manages, the system of units of the distance, rate, or the like, that the vehicle recording device 10 uses, the file name or the folder name of video data to be saved, or necessity of keeping shooting. The controller 20 ends the process.

As described above, in the present embodiment, the map information is information for identifying the area corresponding to the current position of the vehicle and does not contain information on roads, information on geographies, and information on buildings or facilities like detailed map information that a so-called navigation system uses. In the present embodiment, the map information specifies the border of the area as the set of points representing the border. According to the present embodiment, it is possible to keep down the volume of the map information that is used for the process of determining the area, or the like. According to the present embodiment, because the data volume of the map information is kept down, it is possible to keep down the memory capacity of the storage device that stores the map information. According to the present embodiment, because the volume of the map information is kept down, it is possible to reduce the load of process of determining the area using the map information. Accordingly, the present embodiment enables installation in a vehicle electronic device, such as a drive recorder.

Second Embodiment

Figure 5:
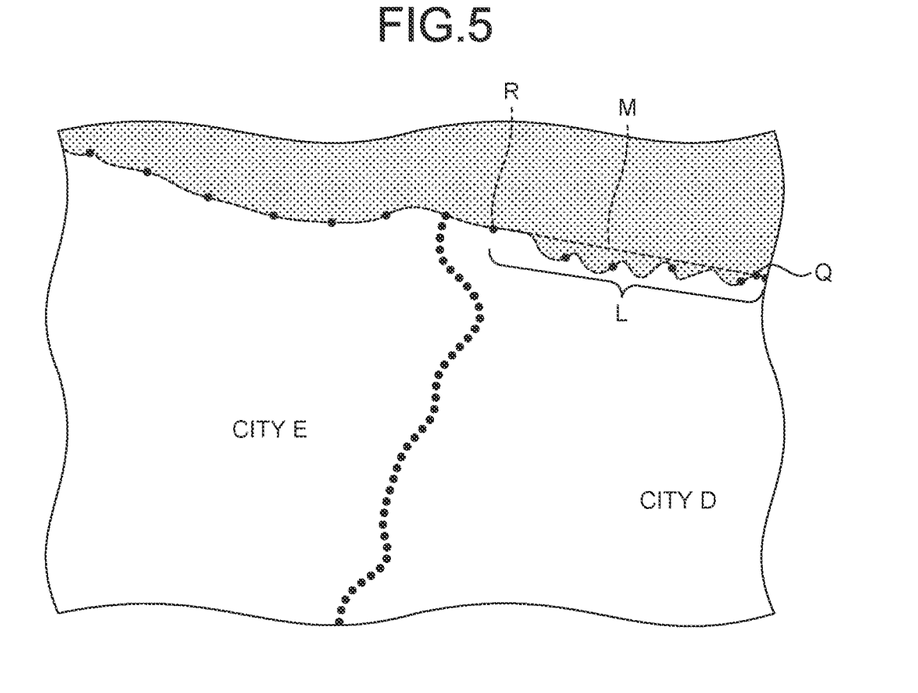
FIG. 5 is a diagram illustrating an example of map information according to a second embodiment and is a diagram in which data on the borer of an area of a coastline is thinned.

With reference to FIG. 5, the vehicle recording device 10 according to the present embodiment will be described. FIG. 5 is a diagram illustrating an example of map information according to a second embodiment and is a diagram in which data on the borer of an area of a coastline is thinned. The basic configuration of the vehicle recording device 10 is the same as that of the vehicle recording device 10 of the first embodiment. In the following description, the same components as those of the vehicle recording device 10 are denoted with the same reference numerals or corresponding reference numerals and detailed description thereof will be omitted. In the present embodiment, the map information storage unit 14 is different from that of the first embodiment.

When the border of an area contains a coastline, the map information storage unit 14 stores map information that specifies the coastline as a set of points that are sparser than those of a land. In FIG. 5, the border between City D and City E is represented by black circles. In FIG. 5, in a part where the border of an area is a coastline, the distance between adjacent points is longer than that in a part where the border of an area is a land. The distance between two points on a coastline, or the like, that are not adjacent to another area may be longer than that on a land, or the like, adjacent to another area. In other words, in the area not adjacent to another area, such as a coastline, accuracy of border data on the area may be lower than that of the part where the border of the area is a land. In the part where the border of the area is a coastline, the distance between adjacent points may be, for example, larger than around few hundred meters and, in the part where the border of the area is a land, the distance between adjacent points may be smaller than around few meters. A specific distance may be set according to various conditions, such as the actual shape of the border, accuracy of the map information, a resolution, a scale, a scale, a region and geographies. For example, in an area L in the part where the border of the area is a coastline, only a point R and a point Q at which the land protrudes may serve as a set of points. In this case, in the area L, the border of the area is a straight line M that is an approximate border line obtained by connecting the point R and the point Q. In the part where the border of the area is a coastline, the set of points need not accurately represent the border of the area.

In general, a vehicle is not positioned on the ocean and therefore an area that should be identified is not set on the ocean. Thus, shifting the coastline onto the ocean, in other words, shifting the border of the area onto the ocean is not a problem in determining the area of the vehicle.

For example, when an intricate coastline is the border of the area, the border of the area may be specified by a set of points containing all the land part. For example, in the map information illustrated in FIG. 5, the border of the area in the area L of the coastline may be specified by only the point Q and the point R. In this case, the border of the area in the area L is the straight line M obtained by connecting the point Q and the point R.

As described above, in the present embodiment, when the border of the area contains a coastline, the map information specifies the coastline as a set of points sparser than those of a land. In the present embodiment, in the map information, when the border of the area contains a coastline, it is possible to simplify the border of the area overlapping the coastline and make the border plain. According to the present embodiment, it is possible to further keep down the volume of map information.

Third Embodiment

Figure 6:
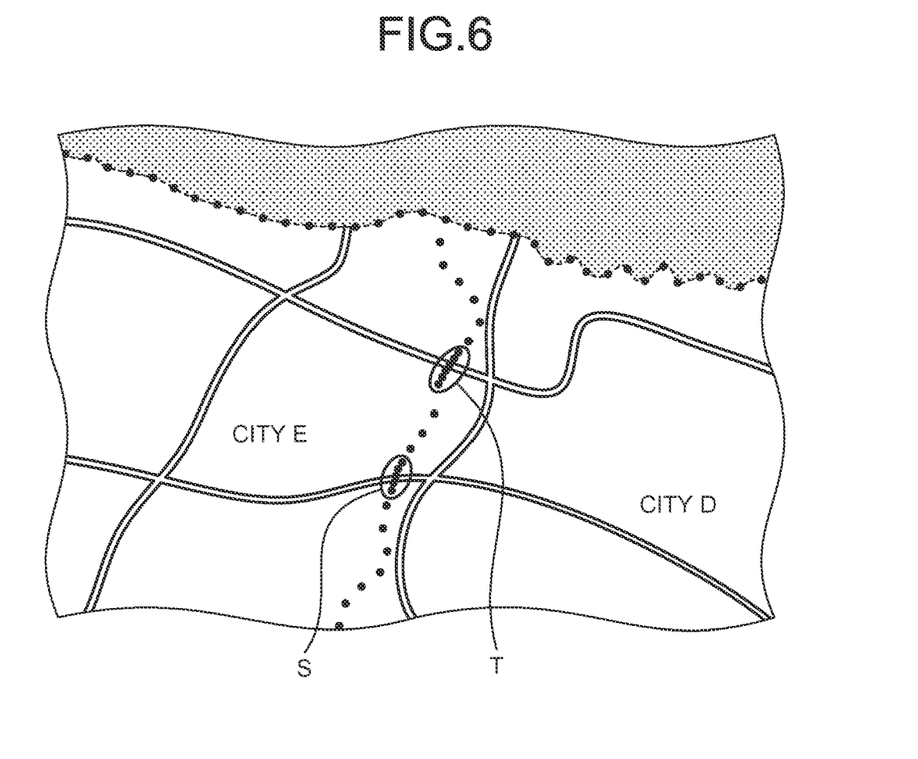
FIG. 6 is a diagram illustrating an example of map information according to a third embodiment and is a diagram in which data on the borer of an area away from a road is thinned.

FIG. 6 is a diagram illustrating an example of map information according to a third embodiment and is a diagram in which data on the borer of an area away from a road is thinned. The basic configuration of the vehicle recording device 10 is the same as that of the vehicle recording device 10 of the first embodiment. In the present embodiment, the map information storage unit 14 is different from that of the first embodiment.

When the border of an area is off a place that is passable by a vehicle, the map information storage unit 14 stores map information that specifies the border as a set of points that are sparser than those of the place passable by a vehicle. In FIG. 6, the border between City D and City E is represented by black circles. For example, in the map information, when the border of the area is off a road, the distance between adjacent points is longer than that in the case where the border of the area is on the road. The distance between two points off the road may be longer than that on the road. A specific distance is set according to various conditions, such as the actual shape of the border, accuracy of the map information, a resolution, a scale, a scale, a region and geographies.

In general, because a vehicle is not positioned in a place that is passable by a vehicle, accuracy of border data on the area may be lower with respect to places other than places passable by a vehicle than that with respect to places passable by a vehicle. As for a place passable by a vehicle, it is desirable that it be possible to more accurately determine the area of the vehicle using the border data on the area with high accuracy. Thus, as for a place passable by a vehicle, it is preferable that the border data on the area be specified as a set of denser points than those of places other than places passable by a vehicle.

In FIG. 6, in an area S and an area T where the border of the area is positioned on a road, the border of the area is specified as a set of denser points than those of other places where the border of the area is off places that are passable by a vehicle.

As described above, in the present embodiment, when the border of the area is off places passable by a vehicle, the map information specifies the border as a set of points sparser than those of the places passable by a vehicle. In the present embodiment, when the border of the area is off places passable by a vehicle, it is possible to simplify the border of the area or make the border plain. According to the present embodiment, it is possible to further keep down the volume of the map information.

Fourth Embodiment

Figure 7:
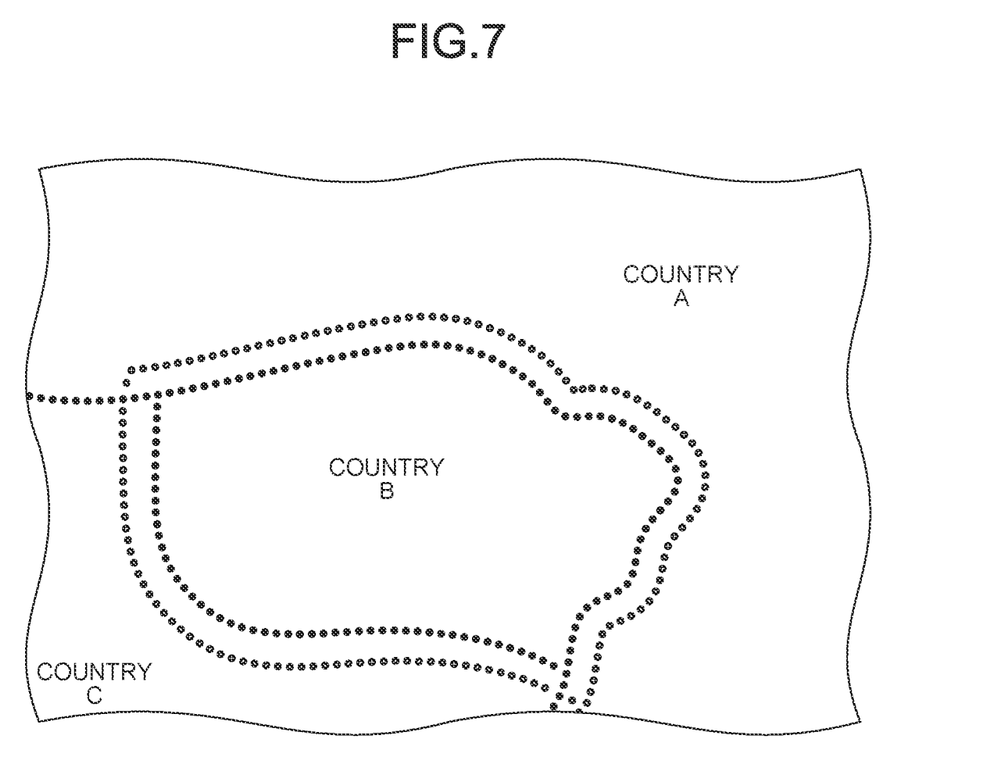
FIG. 7 is a diagram illustrating an example of map information according to a fourth embodiment and is a diagram in which the border of an area is widened.
Figure 8:
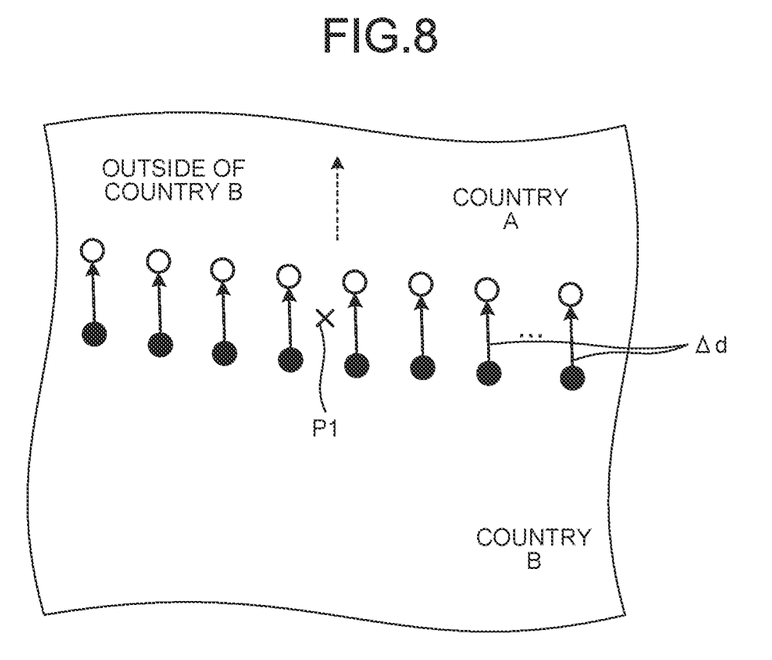
FIG. 8 is a diagram illustrating the border of a normal area and the border of the area that is widened.
Figure 9:
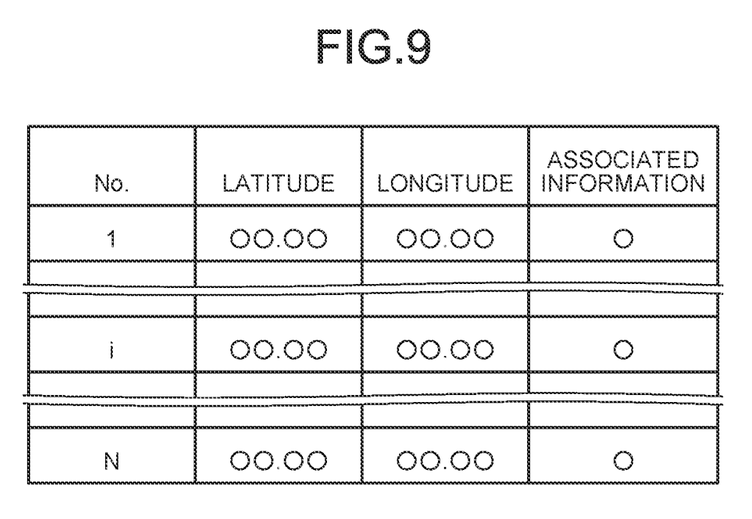
FIG. 9 is a diagram illustrating another example of map information according to the fourth embodiment.

With reference to FIGS. 7 to 9, the vehicle recording device 10 according to the present embodiment will be described. FIG. 7 is a diagram illustrating an example of map information according to a fourth embodiment and is a diagram in which the border of an area is widened. FIG. 8 is a diagram illustrating the border of a normal area and the border of the area that is widened. FIG. 9 is a diagram illustrating another example of map information according to the fourth embodiment. The basic configuration of the vehicle recording device 10 is the same as that of the vehicle recording device 10 of the first embodiment. In the present embodiment, the map information storage unit 14 is different from that of the first embodiment.

The map information storage unit 14 stores map information with the border of an area widened to the outside. In the map information with the widened border of the area, the border is specified as a set of points each of which has been shifted to the outside of the area. More specifically, in the map information with the widened border of the area, latitudes and longitudes serve as the set of points shifted to the outside of the area. An amount of shift Δd by which each point is shifted outward may be around few meters or larger or around few hundred meters or smaller. A specific amount of shift Δd is set according to various conditions, such as the actual shape of the border, accuracy of the map information, a resolution, a scale, a scale, a region and geographies.

The map information illustrated in FIG. 7 and FIG. 8 presents the border of the normal area by black circles and presents the border of the widened area of Country B by white circles. The number of points contained in the set does not change between the map information with the widened border of the area and the normal map information. Thus, even when the border of the area is widened, the volume of data of the map information does not increase.

Even with low accuracy in measuring a position, in order to identify that a vehicle is positioned in a given area without fail, the area identification unit 23 may identify the area using the map information with the widened border of the area. For example, when the current position of the vehicle is positioned within a given distance from the border of the area, the area identification unit 23 may identify the area using the map information with the widened border of the area. For example, when accuracy in positioning by the position information acquisition unit 21 is low, the area identification unit 23 may identify the area using the map information with the widened border of the area.

As for the map information with the widened border of the area, when the area identification unit 23 performs a process, the border of the area may be widened dynamically based on the normal map information that is stored in the map information storage unit 14. In this case, it is unnecessary to have map information on the widened second area dually, which makes it possible to reduce the volume of data of the map information that is stored in advance.

As illustrated in FIG. 9, the map information may include information of an outline for identifying the border of the area and information associated with the information of the outline. The map information illustrated in FIG. 9 includes associated information on each point in addition to the map information illustrated in FIG. 2. The associated information is, for example, control information containing information on whether it is necessary to widen or narrow the map in the area. Information on whether it is necessary to widen or narrow the map is information for indicating whether not to perform widening or narrowing with respect to points not adjacent to another area, such as those of a coastline. When a process of dynamically widening or narrowing the border of the area is performed, the widening or narrowing process is executed on points on which widening or narrowing in the map is "necessary", which are points as the associated information, and the widening or narrowing process is not executed on points on which widening or narrowing in the map is "not necessary". Accordingly, it is possible to reduce computation in the process of widening or narrowing the border of the area.

As for the map information with the widened border of the area, map information on the second area with the border of the area widened to the outside more than in map information on a first area that is the normal area stored in the map information storage unit 14 may be stored.

When the map information with the border of the normal area illustrated in FIG. 8 is used, the area identification unit 23 specifies that a spot P1 is positioned in Country A. When the map information with the border of the widened area of Country B illustrated in FIG. 8 is used, the area identification unit 23 specifies that the spot P1 is positioned in Country B.

As described above, in the present embodiment, the map information specifies the border of the area as the set of points of the border of the area widened to the outside. According to the present embodiment, widening the border of the area also makes it possible to keep down the volume of the map information that is used for the process of determining the area, etc.

On the other hand, detailed map information that a navigation system uses has a large volume of information and computation is excessive and therefore a dynamic map processing process is difficult. As for the map information of the present embodiment, because the volume of data of the map information is reduced more significantly than in the map information that a navigation system uses, it is possible to enable a dynamic map processing process.

Processing the map to widen the border of the area as in the present embodiment makes it possible to, when the accuracy in measuring the current position is low, absorb an error in accuracy in the measurement. Specifically, when the accuracy in measuring the current position is low and it is positioned around the border of the area, widening the border of the area tends to lead to a determination that it is positioned in the area. Thus, for example, widening the border of an area where shooting and imaging are prohibited by law, or the like, makes it possible to avoid making a determination by mistake that it is positioned in an area where shooting and recording are permitted although it is positioned in the area where shooting and recording are prohibited. In this manner, according to the present embodiment, it is possible to reduce a probability that shooting and recording would be performed by mistake against the law and increase a probability that shooting and recording would be avoided in compliance with the law.

The vehicle recording device 10 according to the disclosure has been described and the vehicle recording device 10 may be carried out in various different modes in addition to the above-described embodiments.

Each component of the vehicle recording device 10 illustrated in the drawings is functionally schematic and need not necessarily be physically configured as illustrated in the drawings. In other words, a specific mode of each device is not limited to those illustrated in the drawings, and all or part of the components may be functionally or physically distributed or integrated in a given unit according to the load of processing or usage of each device.

The configuration of the vehicle recording device 10 is, for example, enabled by a program that is loaded in a memory as software. In the above-described embodiments, the configuration is described as functional blocks that are enabled by association of these sets of hardware or hardware. In other words, these functional blocks can be enabled in various forms using only hardware, software, or a combination of hardware and software.

The components described above include those easily assumed by those skilled in the art and those substantially the same. Furthermore, the above-described components can be combined as appropriate. Various omissions, replacements and changes of the components can be made within the scope of the invention. In other words, it only need to be a controller that performs control according to a law that is specified with respect to each area.

The vehicle recording device 10 has been described as an example of the vehicle electronic device; however, there is no limitation thereto. The vehicle electronic device may be a navigation system, an audio device, a display device, or the like. The vehicle electronic device includes an electronic device that is mounted on a vehicle and is used and, when a portable terminal device, such as a smartphone, is mounted on a vehicle and is used, the portable terminal device is included in the vehicle electronic device.

The controller 20 may acquire information on the current position of the vehicle from an external navigation system.

It is possible to use a vehicle electronic device, a control method and a program for, for example, a navigation system.

The computer program for performing the recording control described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the disclosure, an effect that it is possible to reduce the volume of map information for determining an area is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle electronic device comprising:
   a position information acquisition unit configured to acquire position information of a current position of a vehicle;
   a map information storage unit configured to store map information presenting a map for identifying an area corresponding to the current position of the vehicle on the map; and
   an area identification unit configured to identify the area corresponding to the current position of the vehicle based on the position information acquired by the position information acquisition unit and the map information stored in the map information storage unit,
   wherein the map information is information for identifying a border of an area containing a country, a prefecture, a municipality, a state or a district,
   wherein the border of the area is defined by a border line comprising a set of points that extend linearly along a length of the border and have a non-constant density of spacing of the points relative to one another, and
   wherein in the map information, at a location where the border line overlaps a road, the border line has a first density of the spacing of the points, and at a location where the border line is spaced from the road, the border line has a second density of the spacing of the points that is less than the first density.

2. The vehicle electronic device according to claim 1, wherein, in the map information, when the border of the area overlaps a coastline, the border line is specified as a set of points having a third density of the spacing of the points that is less than the second density of the border line over land.

3. The vehicle electronic device according to claim 1, comprising a function controller configured to perform control on a function of the vehicle electronic device according to the area of the vehicle that is identified by the area identification unit.

4. The vehicle electronic device according to claim 1, further comprising:
   a display portion that is configured to visually display the map information, including the set of points of the border line.

5. A control method comprising:
   acquiring position information of a current position of a vehicle; and
   identifying an area corresponding to the current position of the vehicle based on the acquired position information and map information that is stored in a map information storage unit, the map information presenting a map for identifying an area corresponding to the current position of the vehicle on the map, the map information being for identifying a border of an area containing a country, a prefecture, a municipality, a state or a district, wherein the border of the area is defined by a border line comprising a set of points that extend linearly along a length of the border and have a non-constant density of spacing of the points relative to one another, and wherein in the map information, at a location where the border line overlaps a road, the border line comprises a first density of the spacing of the points, and at a location where the border line is spaced from the road, the border line comprises a second density of the spacing of the points that is less than the first density.

6. A non-transitory computer-readable storage medium storing a computer program causing a computer to execute:
acquiring position information of a current position of a vehicle; and
identifying an area corresponding to the current position of the vehicle based on the acquired position information and map information that is stored in a map information storage unit, the map information presenting a map for identifying an area corresponding to the current position of the vehicle on the map, the map information being for identifying a border of an area containing a country, a prefecture, a municipality, a state or a district, wherein the border of the area is defined by a border line comprising a set of points that extend linearly along a length of the border and have a non-constant density of spacing of the points relative to one another, and wherein in the map information, at a location where the border line overlaps a road, the border line comprises a first density of the spacing of the points, and at a location where the border line is spaced from the road, the border line comprises a second density of the spacing of the points that is less than the first density.

* * * * *